(No Model.)  2 Sheets—Sheet 1.

S. A. BHISE.
WEIGHING AND MEASURING DEVICE.

No. 603,122. Patented Apr. 26, 1898.

WITNESSES:
Donn Turtchell
Wm. P. Patton

INVENTOR
S. A. Bhise
BY
Munn
ATTORNEYS.

(No Model.) 2 Sheets—Sheet 2.

S. A. BHISE.
WEIGHING AND MEASURING DEVICE.

No. 603,122. Patented Apr. 26, 1898.

WITNESSES:
Donn Piutchell
Wm L Patton

INVENTOR
S. A. Bhise.
BY
Munn
ATTORNEYS.

UNITED STATES PATENT OFFICE.

SHANKER A. BHISE, OF BOMBAY, INDIA.

WEIGHING AND MEASURING DEVICE.

SPECIFICATION forming part of Letters Patent No. 603,122, dated April 26, 1898.

Application filed April 24, 1897. Serial No. 633,583. (No model.)

*To all whom it may concern:*

Be it known that I, SHANKER A. BHISE, of Bombay, India, have invented a new and Improved Weighing and Measuring Device, of which the following is a full, clear, and exact description.

This invention relates to a novel means for weighing and measuring commodities of a powdered or granular nature; and it essentially consists in the peculiar construction and combination of parts, as is hereinafter described, and pointed out in the claims.

Reference is to be had to the accompanying drawings, forming a part of this specification, in which similar characters of reference indicate corresponding parts in all the figures.

Figure 1:
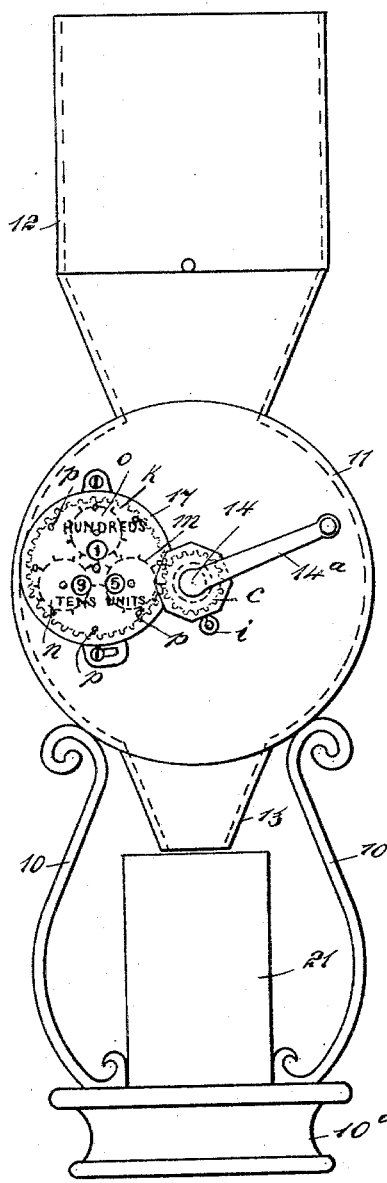
Figure 2:
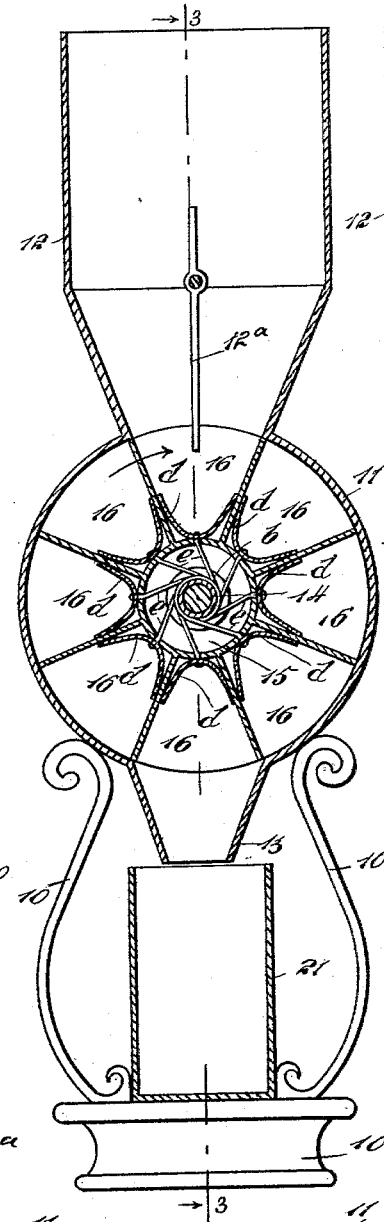
Figure 3:
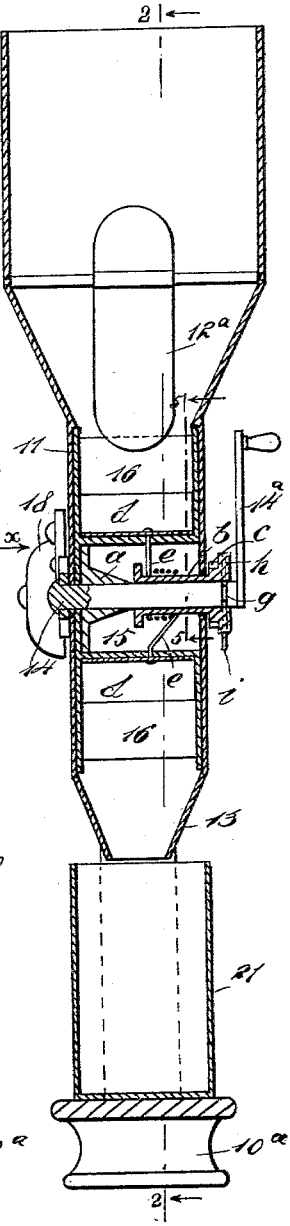
Figure 4:
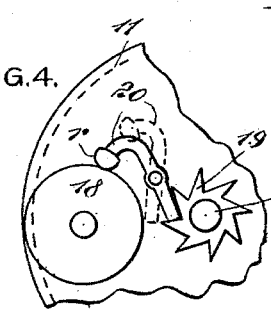
Figure 5:
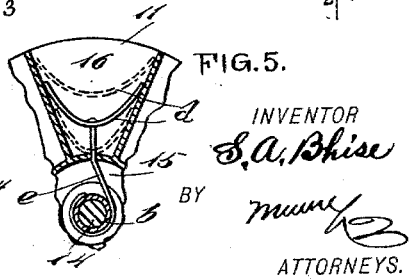
Figure 6:
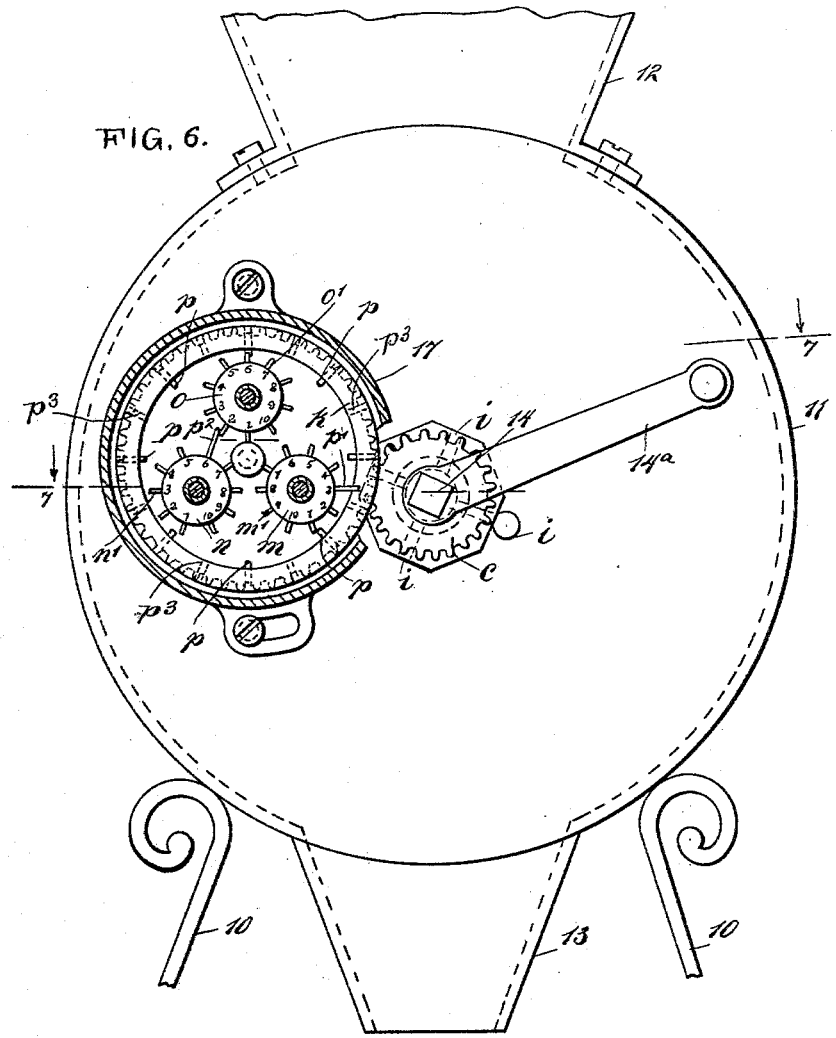
Figure 7:
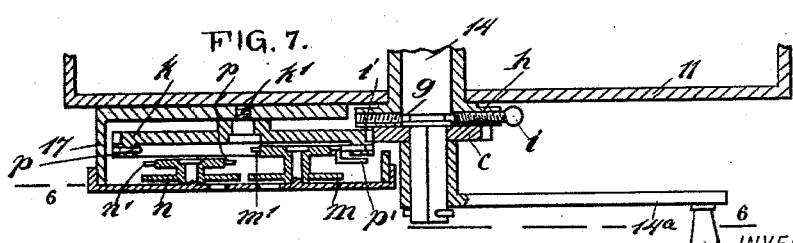

Figure 1 is a side elevation of the improved weighing and measuring device. Fig. 2 is a sectional side view substantially on the line 2 2 in Fig. 3. Fig. 3 is a transverse sectional elevation essentially on the line 3 3 in Fig. 2. Fig. 4 is a fragmentary side view of details seen in direction of the arrow $x$ in Fig. 3. Fig. 5 is a fragmentary sectional side view of parts substantially on the line 5 5 in Fig. 3. Fig. 6 is an enlarged side elevation of the device, partly in section, substantially on the line 6 6 in Fig. 7; and Fig. 7 is a transverse sectional plan view of details essentially on the broken line 7 7 in Fig. 6.

In the drawings representing an embodiment of the improvements an upright skeleton frame is shown comprising four posts 10, mounted upon a base $10^a$, and the frame may be in the form represented or be varied in design, as may be preferred.

On the upper ends of the posts 10 the cylindrical shell or casing 11 is mounted and secured and is apertured at the top and bottom in the same vertical plane which passes through the center of the shell. A hopper 12 of sufficient capacity, which converges a suitable degree toward its lower end, is secured by said end upon the cylindrical shell 11, so as to cover the upper opening therein, and thus adapt the contents of the hopper to pass down through the opening mentioned. A discharging-funnel 13 is secured on the shell 11, the upper end of the funnel inclosing the lowermost opening in the shell. The hopper 12 may have its converged end attached upon the upper portion of the shell, so as to be removed if this is thought to be desirable.

The side walls of the cylindrical shell or casing 11 are centrally perforated, and in said perforations a shaft 14 is journaled, having its ends projected a suitable distance outside of the casing, as is clearly indicated in Fig. 3. On the body of the shaft 14, within the casing 11, a skeleton wheel 15 is mounted and secured, and on the periphery of the wheel is affixed a series of radially-disposed receptacles 16, which are preferably equal in dimensions and occupy the entire perimeter of the wheel, said receptacles being all open at the ends that are uppermost when in register with the base of the hopper 12.

The hub $a$ of the wheel 15 is of a length equal to about half of the width of the casing 11, and on the portion of the shaft 14 not occupied by said hub a sleeve $b$ is loosely mounted. The inner end of the sleeve $b$ contacts with the adjacent end of the hub $a$, and its opposite end projects outside of the casing 11 and has a pinion $c$ formed or secured on this projecting extremity.

The receptacles 16 are designed to receive and discharge material that is to be weighed or measured—such, for example, as sugar, coffee, tea, flour, and spices, and in fact any other granular or pulverized material that is sold by weight or measure. It is essential that the holding capacity of the series of receptacles 16 be adapted for graduation, so as to compensate for differences in weight per cubic inch of the various commodities kept for sale where the improved weighing device is used. To this end a simple and practical attachment for each receptacle is provided and will now be described. A thin elastic false bottom $d$ is furnished for each receptacle 16, which bottoms $d$ are bent, so as to be introduced within the receptacles, as is clearly shown in Figs. 2 and 5, and owing to their resilience said plate-like bottoms have a tendency to rise in the receptacles and spread their ends apart when free to do so. Each bottom plate $d$ has a strong flexible strand or chain $e$, secured by one end near the center of curvature given to the bottom, and from the plates $d$ said flexible connections are respectively extended toward the sleeve $b$, upon which they are secured.

It will be evident that by a rotatable movement of the sleeve $b$ and by reason of its connection with the shaft 14 when the correct adjustment is effected all the bottom plates $d$ may be equally depressed in the receptacles 16 and render them equal in holding capacity.

Various means may be provided for the rotatable adjustment and retention of the sleeve $b$ at a desired point. One simple method for effecting this consists in forming a circumferential groove $g$ in the body of the shaft 14, near its outer end, and then inserting one or more set-screws $i$ in radial threaded perforations formed in a hub-flange $h$, formed on the outer end of the sleeve $b$, the ends of said set-screws being introduced within the groove $g$. Any required fine adjustment of the sleeve on the shaft 14 may obviously be effected by the described means to secure proper capacity for the receptacles 16 to indicate a certain weight for the contents of each receptacle when completely filled from the hopper 12. On the end of the shaft 14, outside of the flange $h$, a crank-handle $14^a$ is secured, whereby the shaft may be rotated and the receptacles 16 be successively located beneath the hopper 12 to receive material therefrom, and when so rotated the lower transverse edges of the hopper will scrape any excess of material from the tops of the receptacles 16.

It is obvious that if the receptacles 16 are adjusted to become units of measure—such, for instance, as a pint, quart, or gallon—the material that is to be measured may be accurately subdivided into parcels which represent desired quantities of such commodities indicated by measure.

In the hopper 12, near its lower end, an agitator-plate $12^a$ is pivoted so that its lower end will project in the path of the upper transverse edges of the receptacles 16.

It will be evident that the rotation of the shaft 14 and receptacles 16 thereon will cause a vibration of the preferably straight agitator-plate $12^a$, which will assure the descent in and escape from the hopper 12 of all material placed therein.

It is a feature of the invention to provide a reliable registering mechanism for the measuring and weighing device, which mechanism consists of the following described parts: A circular gear-box 17 (shown in Figs. 1, 6, and 7) is adjustably secured on the side of the casing 11 nearest the pinion $c$, and on a central journal-stud $k'$ in said box a spur-gear $k$ is rotatably mounted. The spur-gear, as shown, is twice the diameter of the pinion $c$ and meshes with it, as indicated by dotted lines in Fig. 1. The depth of the gear-box 17 is sufficient to permit the toothed indicating-wheels $m$ $n$ $o$ to be located within it at the front face of the spur-gear $k$, these wheels being loosely mounted on journal-studs projecting within the gear-box from the front wall of the same.

The indicating-wheels $m$ $n$ $o$ each have spaced numerals formed or secured on their front faces, and each series of indicating-numerals may respectively be exposed in sequence at suitably-positioned orifices in the front wall of the gear-box 17. The indicating-wheels have each ten teeth, corresponding with the indicating-numbers on their faces. The wheel $m$ is located nearest to the pinion $c$ and indicates units from "1" to "10," inclusive.

On the outer face of the spur-gear $k$, near its periphery, a series of spaced pins $p$ are placed, and said pins are adapted to successively contact with the teeth $m'$ of the units-wheel $m$, that is in the path of the pin. On the wheel $m$ a long tooth $p'$ radially projects and will engage sequentially the spaced teeth $n'$ on the wheel $n$, that denotes sums of ten for each tooth moved by said long tooth. In like manner the wheel $n$ is provided with a long tooth $p^2$, that successively contacts with the teeth $o'$ on the "hundreds-wheel" $o$, and, as usual in devices of this class, the latter-named wheel indicates the aggregate amount registered.

The registering device may have its parts proportioned to indicate one unit for each receptacle 16 that is filled and discharged or any number of such receptacles. As represented in the drawings, there are eight receptacles 16 and eight pins projecting from the spur-gear $k$, and as this gear-wheel is twice the size of the pinion $c$ it will be seen that the discharge of two receptacles 16 will be indicated by the appearance of a numeral on the units-wheel at the appropriate sight-hole in the gear-case.

It will be seen in Fig. 6 of the drawings that a series of sixteen sockets or orifices $p^3$ are formed in the rim of the spur-gear $k$ for receiving the pins $p$ and that from alternate orifices only such projecting pins are shown.

It is evident that by slight alterations in the proportion of parts and the use of a single pin on the spur-gear $k$ the registration of the entire series of receptacles 16 may be indicated and registered by one numeral on the units-wheel $m$, or the number of the pins $p$ on the wheel $k$ may be increased to sixteen, so that the contents of each receptacle 16 will be registered.

In Figs. 3, 4, and 5 a bell attachment is shown as applied to the weighing or measuring device. This appliance comprises a small gong 18, held by a projecting stud on the side of the casing 11 that is farthest from the pinion $c$, and on the end portion of the shaft 14 that extends through this side of the casing a ratchet-wheel 19 is secured.

The bell-clapper 20, having a curved end and heavy hammer-head $r$ thereon, is pivoted in such a relative position on the side of the casing 11 that the smaller end of the clapper-shank will engage with one of the teeth on the ratchet-wheel and the hammer-head *r* have loose contact with the bell. The alarm-bell appliance is so arranged that for every receptacle 16 discharged through the funnel 13 the clapper 20 will strike one on the bell or gong 18.

Assuming that the hopper 12 is supplied with material to be measured or weighed, the operator moves the handle 14ᵃ so as to discharge through the funnel 13 into a vessel or bag 21 the contents of one or more of the receptacles 16.

As before explained, the coacting registering device and the audible alarm device will denote rotatable movements of the crank-handle and indicate the amount of material by weight or measure that has been discharged from the funnel 13.

Having thus described my invention, I claim as new and desire to secure by Letters Patent—

1. In a measuring device, the combination with a series of radially-disposed rotatable receptacles, of an elastic bottom for each receptacle adapted to rise therein by its resilience, and means to simultaneously adjust said elastic bottoms for graduating the capacity of the receptacles, as specified.

2. In a measuring device, the combination with a series of radially-disposed rotatable receptacles occupying a vertical plane, of an elastic bottom in each receptacle, a flexible connection extending from each elastic bottom, and means to simultaneously draw upon the flexible connections to move the elastic bottoms down in the receptacles, and similarly change their capacity, as specified.

3. In a measuring apparatus, the registering and indicating device, comprising a gear-box, a centrally-pivoted spur-gear therein adapted for rotation by a main shaft of the measuring device, a series of indicating-wheels each having spaced radial projections thereon, and a changeable series of projections on the spur-gear, adapted to successively engage with the projections on one of the indicating-wheels, as specified.

4. In a device of the described construction, the combination with a measuring apparatus, comprising mainly a casing, and a series of receptacles radially disposed on a transverse rotatable shaft in the casing, of a registering and indicating device on said casing, comprising a main spur-gear, a pinion on the rotatable shaft meshed with the spur-gear, a series of indicating-wheels each having spaced radial projections, and a series of changeable spaced radial pins that are projectable from the spur-gear, to successively engage with the radial projections on one of the indicating-wheels, whereby the indicator is adapted to denote partial or entire rotations of the shaft and the receptacles thereon, as specified.

5. In a measuring device, the combination with a supported cylindrical casing, having a receiving-aperture and a discharging-aperture therein, of a rotatable transverse center shaft, means to rotate said shaft, a series of radially-disposed receptacles held on the shaft, a bowed resilient bottom plate in each receptacle adapted to rise by its resilience in the receptacle, a sleeve on the center shaft, a securing device between said sleeve and the shaft, and a flexible connection between each resilient bottom plate and the sleeve, as specified.

6. In a measuring device, the combination with a supported cylindrical casing, having opposite receiving and discharging apertures therein, of a transverse rotatable center shaft, means to rotate said shaft, a series of radial receptacles held on the shaft within the casing, a bowed resilient bottom plate in each receptacle adapted to rise therein by its resilience, a sleeve on the center shaft rotatably adjustable thereon by means of a set-screw penetrating the outer end of the sleeve, and a flexible connection extending between each bottom plate and the adjustable sleeve, as specified.

SHANKER A. BHISE.

Witnesses:
MEROYEN ANANDEAN,
GOPINALT LITERAM KARNIK.